United States Patent [19]

Dietl et al.

[11] Patent Number: 4,457,903
[45] Date of Patent: Jul. 3, 1984

[54] SEMICONTINUOUS PROCESS FOR THE PRODUCTION OF PURE SILICON

[75] Inventors: Josef Dietl, Neuötting; Claus Holm, Teising; Jörg Kotilge, Burghausen; Michael Wohlschläger, Unterpfaffenhofen; all of Fed. Rep. of Germany

[73] Assignee: Heliotronic Forshungs und Entwicklungsgesellschaft fur Solarzellen Grundstoffe mbH, Burghausen, Fed. Rep. of Germany

[21] Appl. No.: 470,981

[22] Filed: Mar. 1, 1983

[30] Foreign Application Priority Data

Mar. 11, 1982 [DE] Fed. Rep. of Germany ....... 3208878

[51] Int. Cl.³ ............................................. C01B 33/02
[52] U.S. Cl. .................................... 423/350; 423/348
[58] Field of Search ................................ 423/348–350

[56] References Cited

U.S. PATENT DOCUMENTS

| 2,904,405 | 9/1959 | Thurmond | 423/350 |
| 3,322,503 | 5/1967 | Bloom et al. | 423/350 |
| 4,124,410 | 11/1978 | Kotval et al. | 423/350 |
| 4,312,850 | 1/1982 | Dietl et al. | 423/350 |

Primary Examiner—John Doll
Assistant Examiner—Steven Capella
Attorney, Agent, or Firm—Allison C. Collard; Thomas M. Galgano

[57] ABSTRACT

Pure silicon is obtained in a semicontinuous process by reducing quartz sand with aluminum in a slag medium based on alkaline earth metal silicates. The slag serves thereby simultaneously as a solvent for the aluminum oxide that forms and as an extraction medium for impurities that occur. The silicon formed separates out of the silicate slag and can be separated off. The aluminum oxide produced by the reduction can be separated from the slag and used for recovery of reusable aluminum.

7 Claims, 1 Drawing Figure

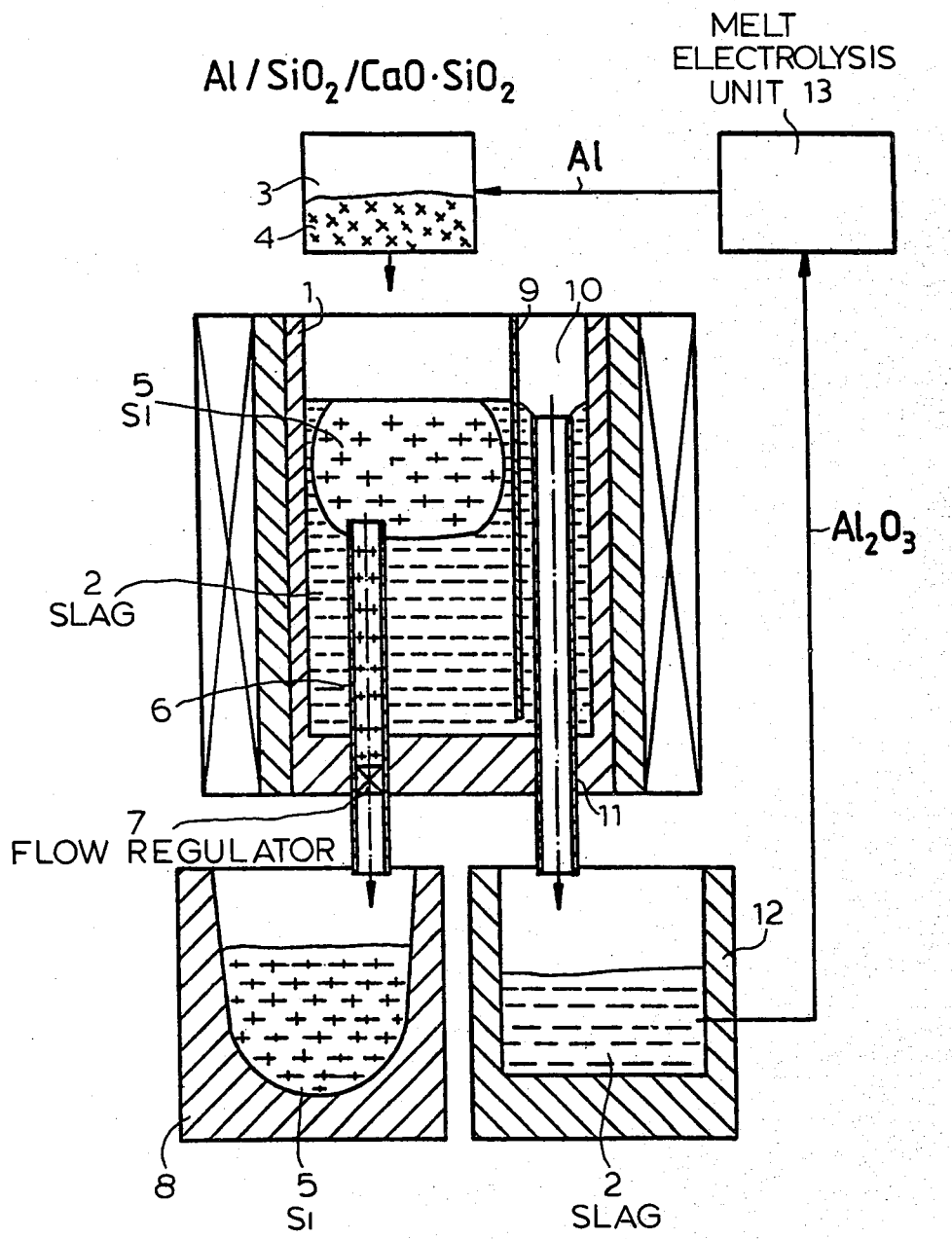

SEMICONTINUOUS PROCESS FOR THE PRODUCTION OF PURE SILICON

The present invention relates to a semicontinuous process for the production of pure silicon by reduction of quartz with aluminum.

As a base material for inexpensive solar cells for terrestrial use, silicon is currently still far too expensive. A fundamental reason for its high price is the previously customary complicated purification process, in which crude silicon, obtained initially by reducing quartz with carbon, is converted into trichlorosilane by the action of hydrogen chloride. The trichlorosilane can be purified by distillation and, finally, can be decomposed in the presence of hydrogen to give a high-purity polycrystalline silicon. The silicon obtained in this manner then meets even the strict purity requirements for electronic components. Such a high purity is not, however, necessary for silicon intended as a base material for solar cells, especially when polycrystalline silicon having grain boundaries gettering impurities is used. There has therefore been no shortage of attempts to replace the classical purification process by a more cost-effective process.

The so-called "sulphur-thermite process", described for the first time by K. A. Kühne in *Chemische Zentralblatt,* 75, page 64, No. 14 78 71 (1904), comprising the reaction of a mixture of aluminum powder, sulphur and quartz, gives, even in the version improved by H. V. Wartenberg, a silicon yield of only 50% of the theoretical yield. After purification "by melting in silicon tetrachloride", there still remains a 0.1% content of metal impurities, which diminishes the usefulness of the material even in the opinion of the manufacturer (*Z. anorg. Chemie,* 286, 247–253 (1956)).

According to a more recent process, quartz may be reduced by aluminum in the presence of an aluminum sulphide slag to give elemental silicon. In this process, the aluminum acts simultaneously as a reducing agent for the quartz and as a solvent for the silicon that has formed, which can subsequently be crystallized out of the solution in an already very pure form, by cooling. This process, however, requires a lot of aluminum and, on account of the odor and toxicity of the aluminum sulphide, requires additional protective measures.

The object of the invention was therefore to provide a process which may be used on a commercial production scale, and which, starting from quartz, permits the production of pure silicon for solar cells while avoiding the expensive gas-phase deposition, and without having the disadvantages of the previously known processes.

This object is attained according to the present invention by a process which is characterized in that quartz and aluminum are introduced batch-wise into a molten alkaline earth metal silicate slag present in a reaction vessel. The resulting silicon that separates out from the slag is then removed in portions from the reaction vessel, and, to regenerate the slag containing dissolved aluminum oxide that has been produced, slag material that is poor in aluminum oxide is added and a corresponding amount of the slag enriched with aluminum oxide is removed from the reaction vessel.

A special advantage of the process according to the invention compared with the classical arc process is that it is not absolutely necessary to use quartz in the form of lumps; on the contrary, even quartz sand may be used with advantage, preferably in grain sizes ranging from 0.1 to 5 mm. Although heavily contaminated quartz sand may, in principle be used directly, it is advantageously pre-purified to a purity of, suitably, at least 98% by weight of quartz, in order to obviate premature overloading of the slag used in the process. Advantageously, however, recourse is made to quartz sand having a purity of more than 99.9%, which is available in large amounts. Numerous silicates, such as kaolinites, for example, various types of mica, feldspars or layer structure silicates, are also suitable starting materials after they have undergone suitable chemical and physical processing to silica powder.

The aluminum serving as reducing agent is advantageously used in as pure as possible a form, in order to avoid entrainment of additional impurities. The use of electrolytically purified aluminum having a purity of at least 99.9% has proved particularly successful. If the impurities are substances that accumulate in particular in the slag, then lower degrees of purity of the aluminum may be tolerated. On the other hand, as regards impurities that dissolve only slightly in the slag, such as iron or phosphorus for example, care must be taken from the start that the aluminum is as pure as possible.

The most suitable base material for the slag serving as reaction and extraction medium has proved to be silicates of the alkaline earth metals magnesium, calcium, strontium and barium, which may be used both in pure form and as mixtures of two or more components. As base material for a particularly cost-effective slag, inexpensive calcium silicate, for example, is recommended, to which other silicates, e.g., such as magnesium silicate, may be added. On the other hand, e.g., barium silicate, which may be obtained in especially pure form, is particularly suitable for a very pure slag. Favorable results may also be obtained when up to 30 mole % of alkaline earth metal fluorides or other substances that increase the solubility in the slag or the aluminum oxide that is formed are added to the slag.

According to the process of this invention, first of all, the alkaline earth metal silicate slag is introduced into a reaction vessel, which preferably is of graphite or a carbonaceous ramming mass. The slag may have been worked up in a separate vessel and then added in an already molten form, but may also be brought to the preferred reaction temperature of from 1420° to 1600° C. in the reaction vessel, which is, for example, heated by induction. This temperature range is particularly favorable, as the silicon is then produced in molten form and side reactions, such as, for example, the formation of SiO and the evaporation of volatile slag constituents, do not at this stage have any adverse effect. In principle, however, it is also possible to use higher reaction temperatures.

The amount of slag introduced is advantageously selected to be such that the aluminum oxide produced in the first reaction cycle is completely dissolved in the slag. It is especially advantageous that the melting temperature of the mixture of slag and aluminum oxide that is formed should always remain within the above-specified temperature range, so that solidification of the slag is avoided, and the slag may thus always be charged into a liquid sump. The corresponding quantity ratios and melting temperatures can be taken from the pertinent phase diagrams (see, for example, *Phase Diagrams for Ceramists,* The American Ceramic Society, Inc., Vol. 1 (1964), Vol. 2 (1969), Vol. 3 (1975)).

The molten slag now has the reaction material added to it at the working temperature. Especially good results are obtained when quartz and aluminum are premixed in an approximate or accurate stoichiometric ratio and incorporated portion-by-portion into the slag. Advantageously, quartz and aluminum are present in a molar ratio of at least 3:4. Whereas, in fact, a slight shortfall of aluminum has no adverse effect, because the unreacted quartz then remaining dissolves in the slag, an excess of aluminum may lead to a detrimental reducing action by the aluminum on the slag, on account of silicide formation, if the entire amount of quartz is consumed. Furthermore, if the operation is carried out with air being admitted, then excess aluminum may be completely oxidized by atmospheric oxygen and thus be lost as a reducing agent.

As the reaction material, in the especially preferred embodiment of the invention, is weighed and thoroughly mixed in suitable quantitative proportions outside the reaction vessel, then on the subsequent portion-by-portion introduction of the reaction material, strictly speaking, even stirring is not necessary. Despite this, by using a suitable stirrer, e.g., a paddle stirrer made of carbon or graphite, the dissolution of the reaction material in the slag may be improved. An especially good stirring action can also be achieved by a perforated plate of, e.g., graphite being moved preferably vertically through the reaction mixture.

Because of the exothermic nature of the reduction reaction of quartz with aluminum, the reaction vessel needs to be heated completely externally only during the initial phase, i.e., during the melting of the slag and at the beginning of the reaction. Once the reaction has started, however, the temperature progression may be controlled by the speed of subsequent additions and the intensity of the stirring so that external heating can be substantially reduced. Only when the reaction subsides is it necessary to apply heat again, in order to prevent the temperature dropping below the melting point of the reagents and thus prevent solidification of the reaction mixture.

When the amount of reaction material, which has been added gradually, has completely reacted, which, e.g., using thermoelements provided in the reaction vessel, may be observed by a fall in the reaction temperature, the system is given time to separate out. During this so-called relaxation phase, the stirrer is stopped, and, if desired, removed from the reaction mixture, so that on account of the density ratios the slag begins to settle in the reaction vessel. The silicon formed collects on the surface of the slag and always remains separated from the wall of the reaction vessel by a thin layer of slag. A special advantage in this connection is that the oxides of the impurities forming as a result of reaction with the ambient atmosphere, e.g., atmospheric oxygen, at the surface of the silicon that has formed, dissolve excellently in the surrounding slag. For this reason, it is not absolutely essential to perform the process according to the invention under a vacuum or a protective gas in a closed system. Especially good results are achieved even in an open system, with air being admitted.

When the separation of the slag from the silicon has finished, and the relaxation phase has therefore terminated, the silicon formed is removed from the reaction vessel. This can be effected, for example, by a drain-off vessel, such as, for example, a drainage tube made, e.g., of graphite extending from below, or laterally, into the molten silicon. Another advantageous embodiment consists of introducing a suitable tube, for example, of graphite, usually from above, into the silicon to be removed, and by applying a vacuum, drawing the silicon into another container where it may then be subjected, for example, to controlled solidification or to vacuum evaporation. Because of its high purity, the silicon obtained in the process according to the invention represents a base material especially well suited for further processing to solar cells.

With the removal from the reaction vessel of the silicon that has formed, the initial stage of the process is terminated and the system is available for the actual semicontinuous operating cycle. A further portion of the reaction mixture comprising quartz and aluminum is now added to the molten slag present in the reaction vessel, which contains the aluminum oxide that has formed in dissolved form. In order to keep the slag receptive to the aluminum oxide that is in the process of forming, however, it has to be regenerated by the addition of fresh slag material. For this purpose, a suitable amount of slag material which contains either no, or only a small portion of, aluminum oxide, is introduced into the reaction vessel. The mixed individual components, that is to say, in the case of a calcium silicate slag, calcium oxide and silica for example, or alternatively the corresponding compound, that is to say, for example, calcium silicate or mixtures of calcium silicate, calcium oxide and silica, may advantageously be added together with the reaction mixture, or alternatively separately therefrom.

An amount of spent slag, corresponding approximately to the amount of fresh slag added, is removed from the reaction vessel. This is achieved in a particularly simple manner by providing in the reaction vessel a drainage system, which, in a special embodiment of the invention, may operate, for example, in accordance with the siphoning principle. To this end, a separating wall, preferably consisting of graphite, and projecting vertically through the slag is provided in the reaction vessel. Above the floor of the reaction vessel the separating wall leaves free an opening, generally formed as a slit, in order to permit the slag to flow through. Thus, the slag is able to adjust to equal levels on both sides of the separating wall. In this connection, it has proved successful to select the height of the slit, to be sufficiently small, e.g., 5 mm so that because of the wetting relationships only slag, and not silicon, is able to escape. Thus, the entire amount of silicon remains on one side of the separating wall while on the other side there is only slag. Advantageously, a separating wall, e.g., of graphite, which is provided with small apertures of approximately 5 mm diameter, may also be used and likewise permits only the slag and not the silicon to pass through.

In the part of the reaction vessel—the slag drainage chamber—separated by the separating wall from the reaction chamber, a graphite tube, for example, is provided as the drain for the slag. It has proved especially favorable if the drainage tube is height adjustable, because it is then extremely simple to set the desired height of the slag level in the entire reaction vessel.

The spent slag flowing out the slag drainage chamber finally passes into a slag work-up chamber, where it is worked up to recover the aluminum oxide dissolved in it. The aluminum oxide can be crystallized out by cooling, and, for example, can be separated off by filtration by means of a suitable graphite filter or, alternatively, by centrifuging. Another suitable method is, e.g., to deposit the aluminum oxide onto cooled plates of, e.g., graphite, immersed in the molten slag. The aluminum oxide content of the spent slag prior to the work-up amounts to up to 60% by weight, preferably 35 to 50% by weight.

The separated aluminum oxide is finally subjected to reduction, e.g., by conventional melt electrolysis in molten cryolite, to recover the aluminum. The resulting pure aluminum can then be reintroduced into the reaction cycle. Limits are set to the reusability of the slag, however, on account of the accumulation of impurities occasioned by the extraction effect.

Other objects and features of the present invention will become apparent from the following detailed description considered in connection with the accompanying drawing, which discloses one embodiment of the invention. It is to be understood that the drawing is to be used for the purposes of illustration only, and not as a definition of the limits of the invention.

In the drawing, the inventive circulation process is schematically illustrated.

Referring now in detail to the drawing, a molten slag 2 of alkaline earth metal silicates is present in the reaction vessel 1. The reaction mixture 4 of quartz and aluminum is added to the slag from a reservoir 3. After the completed reaction and stabilization phase, the silicon 5 that has formed separates from the slag and can be discharged via a drainage tube 6 with a flow regulator 7 into the chill mold 8 and treated further. By renewed addition of reaction mixture and slag base material, a part of the spent slag is then forced into the slag drainage chamber 10 divided off by a separating wall 9, from where it flows via a drainage tube 11 into the slag workup chamber 12. Here, the aluminum oxide dissolved in the slag is separated out and fed to the melt electrolysis unit 13, from which recovered aluminum is again introduced into the reaction mixture 4.

The invention will now be described by reference to several examples, which are given by way of illustration and not of limitation.

EXAMPLE 1

In an open graphite crucible, corresponding to crucible 1 of the drawing, 2000 g of slag, comprising 48% by weight of calcium oxide and 52% by weight of quartz, were melted at 1550° C. until the melt level in the reaction chamber and in the slag discharge chamber had equalized. 1000 g of aluminum and 1660 g of quartz sand were then gradually introduced into the reaction chamber. After a reaction time of about 30 minutes, the two phases of slag and resultant silicon had separated so that the silicon drain could be opened, whereupon 780 g of silicon ran off.

At intervals of 5 minutes, three batches, each of 333 g of aluminum and 553 g of quartz, were then added, and additionally, as solvent for the resultant aluminum oxide, 190 g of slag, comprising 48% by weight of calcium oxide and 52% by weight of quartz, were added per 100 g of aluminum. An amount of spent slag determined by the height of the drainage tube ran out of the reaction chamber.

After a further 30 minutes, an amount of 860 g of silicon could be let out of the reaction vessel; by adding reaction material a further reaction cycle commenced.

The silicon obtained and the starting materials contained the following impurities (data in ppm by weight):

|       | Mn    | Cr   | Cu   | Ni   | Fe   | Al   | Ca   | Mg   | Ti   | B    | P    |
|-------|-------|------|------|------|------|------|------|------|------|------|------|
| $SiO_2$ | 67.3  | <4   | 3.5  | 13   | 168  | —    | —    | —    | 64.1 | <1   | 40.2 |
| CaO   | 197.3 | 10.2 | 6.7  | 31.7 | 546  | —    | —    | —    | 26   | <2   | 36.7 |
| Al    | <2    | 27.5 | 11.7 | 25.8 | 362  | —    | 19.6 | 20   | 19   | 2    | <5   |
| Si    | 100   | 20   | 15   | 30   | 1000 | 1000 | 500  | 60   | 35   | 0.4  | 70   |

EXAMPLE 2

In an open graphite crucible, corresponding to crucible 1 of the drawing, 3900 g of slag, comprising 63.5% by weight of barium oxide and 36.5% by weight of quartz, were melted at 1550° C. until the melt level in the reaction chamber and in the slag drainage chamber had equalized. 1000 g of aluminum and 1660 g of quartz were then gradually introduced into the reaction chamber. After a reaction time of about 30 minutes, the two phases of slag and resultant silicon had separated, so that the silicon drain could be opened, whereupon 750 g of silicon ran off.

At intervals of 5 minutes, three batches, each of 333 g of aluminum and 553 g of quartz, were added, and additionally, as solvent for the resultant aluminum oxide, 390 g of slag, comprising 63.5% by weight of barium oxide and 36.5% by weight of quartz were added per 100 g of aluminum. An amount of spent slag determined by the height of the drainage tube ran out of the reaction chamber.

After a further 30 minutes, an amount of 830 g of silicon could be let out of the reaction vessel; by introducing reaction material a new reaction cycle commenced.

The silicon obtained and the starting materials contained the following impurities (data in ppm by weight):

|        | Mn   | Cr   | Cu   | Ni   | Fe  | Al   | Ca   | Mg | Ti   | B   | P   |
|--------|------|------|------|------|-----|------|------|----|------|-----|-----|
| $SiO_2$  | 67.3 | <4   | 3.5  | 13   | 168 | —    | —    | —  | 64.1 | <1  | 40.2 |
| $BaCO_3$ | 10.5 | <2   | 2.2  | 12.7 | 33  | —    | —    | —  | 0.7  | 2   | <1  |
| Al     | 2    | 27.5 | 11.7 | 25.8 | 362 | —    | 17.6 | 20 | 19   | 2   | <5  |
| Si     | 50   | 15   | 15   | 35   | 800 | 1000 | 50   | 5  | 30   | 0.5 | 50  |

While only one embodiment and several examples of the present invention has been shown and described, it is obvious that many changes and modifications may be made thereunto without departing from the spirit and scope of the invention.

What is claimed is:

1. A semicontinuous process for the production of pure silicon by reducing quartz with aluminum, comprising the steps of:

introducing quartz and aluminum batch-wise into a molten alkaline earth metal silicate slag present in a reaction vessel, whereupon said slag becomes enriched with dissolved aluminum oxide and silicon is formed which separates out from said slag, removing said silicon in portions from said reaction vessel; and regenerating said slag containing dissolved aluminum oxide by adding fresh slag material and removing a corresponding amount of said slag enriched with aluminum oxide from said reaction vessel.

2. The process of claim 1, wherein said quartz and aluminum are introduced in a molar ratio of at least 3:4.

3. The process of claim 1, wherein the aluminum oxide content of the slag enriched with aluminum oxide which is removed from the reaction vessel amounts to from 35 to 50% by weight.

4. The process of claim 1, wherein a reaction temperature of from 1420° to 1600° C. is maintained.

5. The process of claim 1, wherein said alkaline earth metal silicate slag comprises a member selected from the group consisting of calcium silicate, barium silicate and mixtures of calcium silicate and barium silicate.

6. The process of claim 1, wherein said alkaline earth metal silicate slag has not more than 30 mole % of alkaline earth metal fluorides added to it.

7. The process of claim 1, wherein a reaction temperature of at least 1420° C. is maintained.

* * * * *